United States Patent [19]

Tsai et al.

[11] Patent Number: 4,480,607
[45] Date of Patent: Nov. 6, 1984

[54] BALANCER FOR 90 DEGREE V6 ENGINES AND THE LIKE

[75] Inventors: Lung-Wen Tsai, Troy; Robert L. Jacques, Livonia, both of Mich.

[73] Assignee: General Motors Corporation, Detroit, Mich.

[21] Appl. No.: 519,018

[22] Filed: Aug. 1, 1983

[51] Int. Cl.³ .............................................. F16F 15/26
[52] U.S. Cl. ............................ 123/192 B; 123/192 R; 74/603; 74/604; 464/104; 464/105; 464/180
[58] Field of Search ........... 123/192 R, 192 B, 197 R; 74/603, 604; 464/104, 105, 180

[56] References Cited

U.S. PATENT DOCUMENTS

| | | | |
|---|---|---|---|
| 1,459,035 | 6/1923 | Raisig | 464/105 |
| 1,948,708 | 2/1934 | Grundy | 464/102 |
| 2,007,513 | 7/1935 | Westburgh | 464/102 |
| 2,218,580 | 10/1940 | Kennedy | 464/7 |
| 2,498,877 | 2/1950 | Candor | 74/603 |
| 2,513,684 | 9/1950 | Shenk | 464/102 |
| 2,838,957 | 6/1958 | Johnson | 74/604 |
| 3,166,054 | 1/1965 | Conover | 123/55 |
| 3,308,680 | 3/1967 | Sherrick | 74/603 |
| 3,511,110 | 5/1970 | Grieve | 74/604 |
| 3,606,768 | 9/1971 | Wildhaber | 464/103 |

FOREIGN PATENT DOCUMENTS 572621 11/1945 United Kingdom ................ 464/102

*Primary Examiner*—Ira S. Lazarus
*Assistant Examiner*—R. S. Bailey
*Attorney, Agent, or Firm*—Robert J. Outland

[57] ABSTRACT

An even firing 90° V6 four stroke cycle engine is provided with a single line balancer having a combination of primary balance weights and secondary Oldham coupling balancers rotating opposite crankshaft rotation which, combined with crankshaft counterweights, provide complete offsetting of the engine primary rotating unbalance couple together with offsetting of a large portion of the engine secondary rotating unbalance couple and leaving a small residual secondary unbalance couple for absorption by the engine mounting system.

6 Claims, 7 Drawing Figures

B - ANGLE BETWEEN CYLINDER BANKS - 90°
C - ANGLE BETWEEN CRANK THROWS - 120°
S - SPLIT ANGLE BETWEEN CRANK PINS ON A THROW - 30°

EVEN FIRE AT 120°
CLOCKWISE ROTATION
FIRING ORDER 1-6-5-4-3-2

BALANCER FOR 90 DEGREE V6 ENGINES AND THE LIKE

TECHNICAL FIELD

This invention relates to internal combustion engines and to vibration balancers for such engines. In particular the invention relates to balancing systems for offsetting, at least partially, primary and secondary unbalance couples occurring in 90° V6 engines and the like.

BACKGROUND

The operation of a 90° V6 four stroke cycle internal combustion piston engine having offset crankpins on each throw to provide even firing intervals is such that movement of the piston-crank mechanism causes a mechanical imbalance comprising an eccentric primary rotating unbalance couple turning in the direction of crankshaft rotation and an eccentric secondary rotating unbalance couple turning opposite the direction of crankshaft rotation. The rotating forces of these unbalanced couples are cyclically variable, having generally egg-shaped or elliptical configurations, when graphically presented, with their smaller moment axes lying in a longitudinal plane (often extending vertically) spaced equally between the cylinder banks and their larger moment axes extending (usually horizontally) at right angles to the longitudinal plane between the cylinder banks.

To fully balance these rotating couples would require four sets of longitudinally spaced balance weights including two pairs oppositely rotated at crankshaft speed and two pairs oppositely rotated at twice crankshaft speed. A substantial portion of the primary unbalance can be easily offset by the application of counterweights to the engine crankshaft in accordance with common practice. However, offsetting the remaining primary and secondary unbalance requires the addition of extra balancing mechanism, adding additional complexity and cost to the engine structure. Thus, in many applications the residual primary and secondary unbalance is not offset but, instead, is absorbed in resilient engine mounting systems which reduce the transmission of engine vibrations to the vehicle frame, or other structure in which the engine may be mounted.

SUMMARY OF THE INVENTION

The present invention provides relatively simple and compact balancing means for offsetting the eccentric primary unbalance couples and a large portion of the eccentric secondary unbalance couples of 90° V6 engines and the like. The balancing means includes simplified balance weight driving and supporting structure, which may be mounted within the engine oil pan, to supplement the balancing effect of cooperating crankshaft counterweights.

The supplemental balancing structure incorporates a pair of longitudinally spaced Oldham coupler balancers connected by a drive shaft and having connected therewith primary balance weights, all of which are driven at crankshaft speed in a rotational direction opposite that of the crankshaft. The primary balance weights combine with weights on the engine crankshaft to offset the primary unbalance couples while the Oldham coupler balancers include orbiting coupler members which are operative to offset a large portion of the secondary unbalance couples, leaving a small secondary unbalance that may be desirably arranged to be absorbed in the engine mounting system.

The general operation of the Oldham coupler balancers incorporated in the present invention is more fully disclosed in conjunction with another form of engine balance mechanism in U.S. patent application Ser. No. 343,450 filed Jan. 28, 1982 in the name of Lung-Wen Tsai and assigned to the assignee of the present invention.

These and other features of the invention will be more fully understood from the following description of a preferred embodiment taken together with the accompanying drawings.

BRIEF DRAWING DESCRIPTION

DETAILED DESCRIPTION

Figure 1:
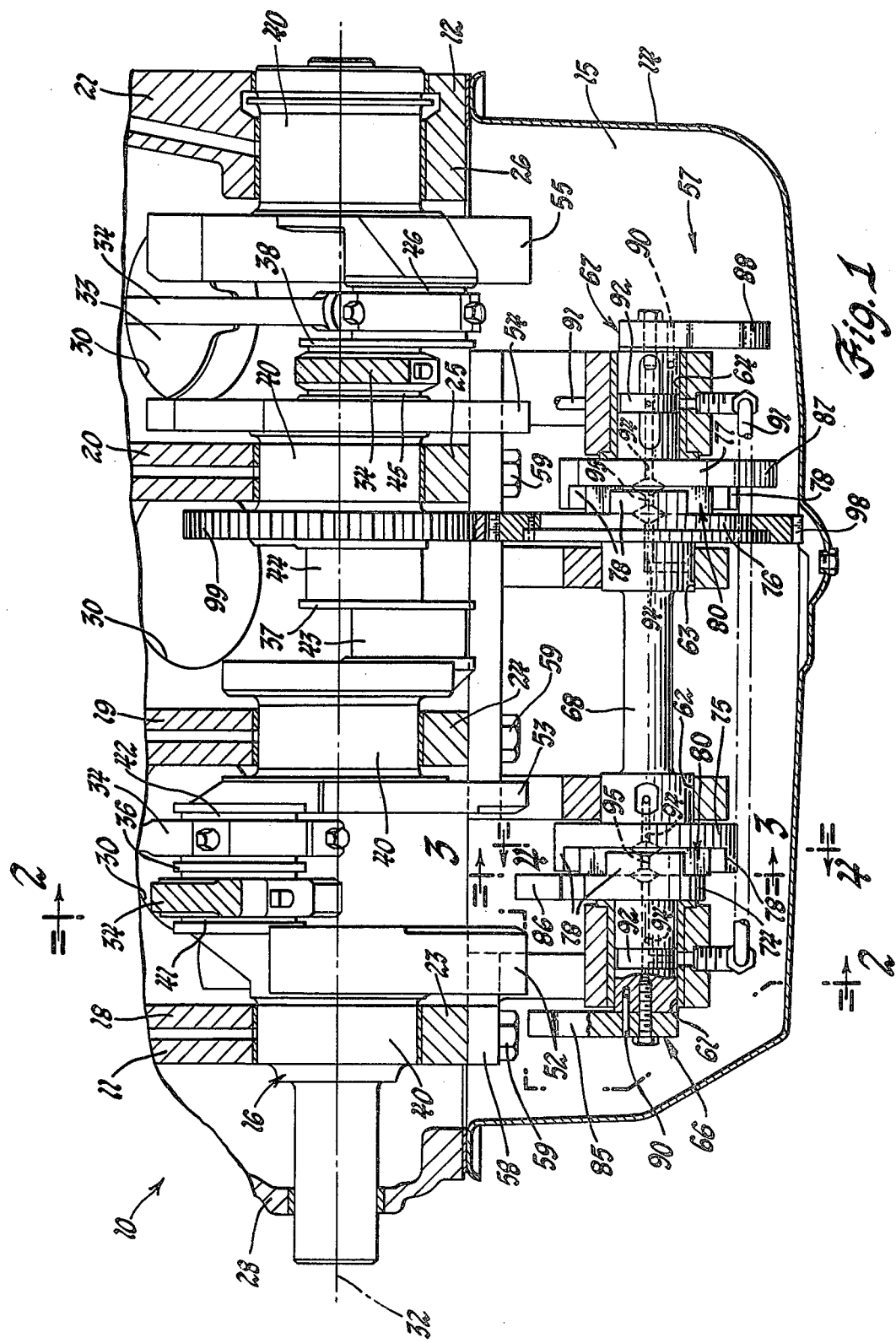
FIG. 1 is a longitudinal cross-sectional view showing the lower portion of an even firing four stroke cycle 90° V6 engine with balancer means in accordance with the invention.

Referring now to the drawings in detail, numeral 10 generally indicates a 90° V-type 6 cylinder even firing four stroke cycle internal combustion engine of a type for use in automotive vehicles.

Engine 10 includes a cylinder block 11 having an open bottom 12 closed by an oil pan 14 to enclose a crankcase and oil sump cavity 15. Within the upper portion of the cavity 15 a crankshaft 16 is rotatably supported against transverse walls or bulkheads 18–21 of the cylinder block by main bearing caps 23–26 respectively.

The cylinder block further includes two V-arranged cylinder banks 28, 29, each having three aligned cylinders 30. The cylinders of the two banks are arranged in generally opposite pairs, slightly offset longitudinally and are also angularly offset at the bank angle of 90° around the crankshaft rotational axes 32.

Figure 2:
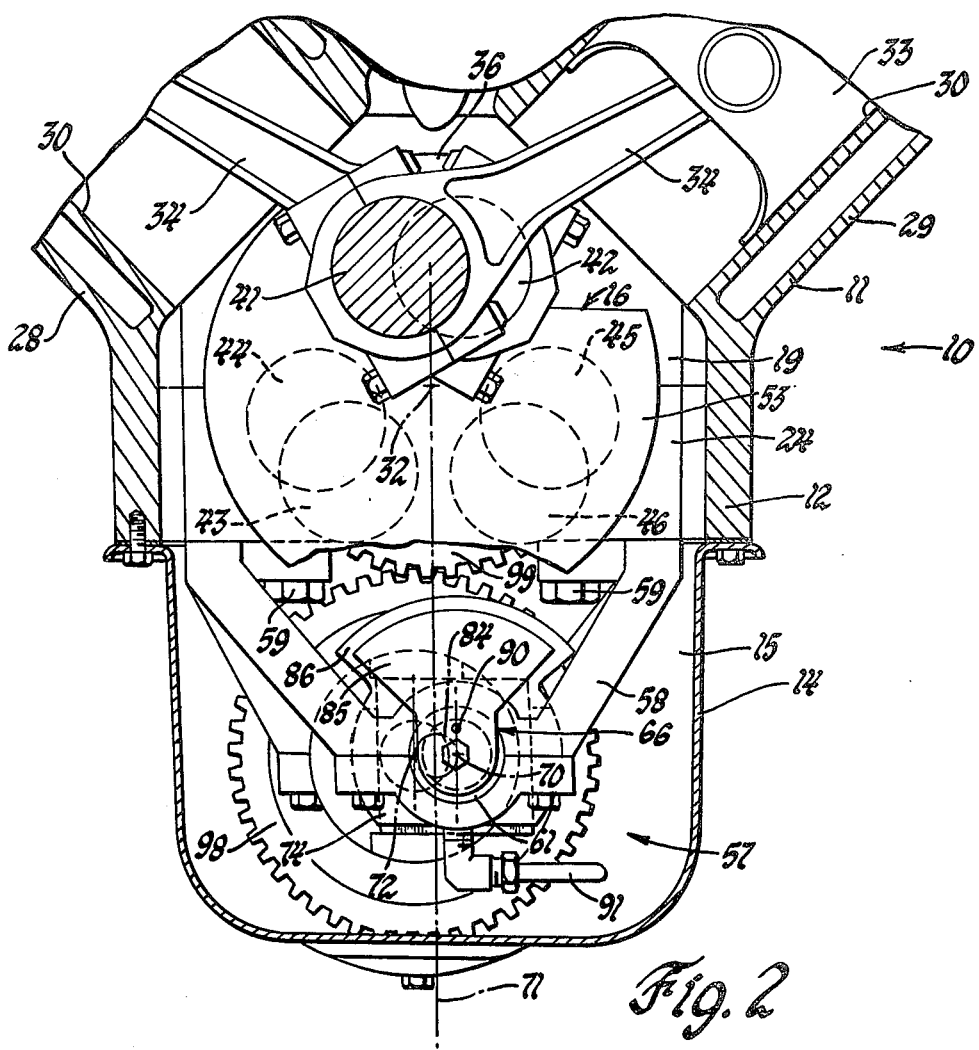
FIG. 2 is a transverse cross-sectional view of the engine and balancer taken generally in the plane indicated by the line 2—2 of FIG. 1.
Figure 3:
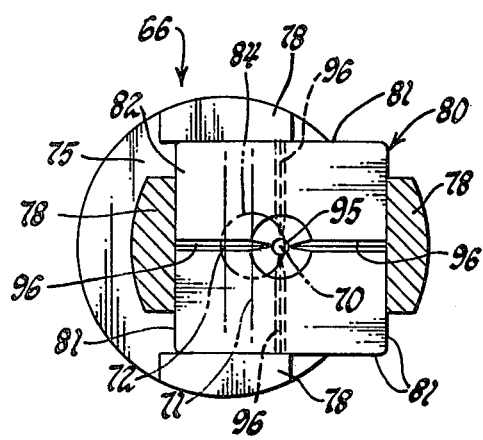
FIG. 3 is a transverse cross-sectional view through a portion of one Oldham coupling balancer looking aft from the plane indicated by the line of 3—3 of FIG. 1.
Figure 4:
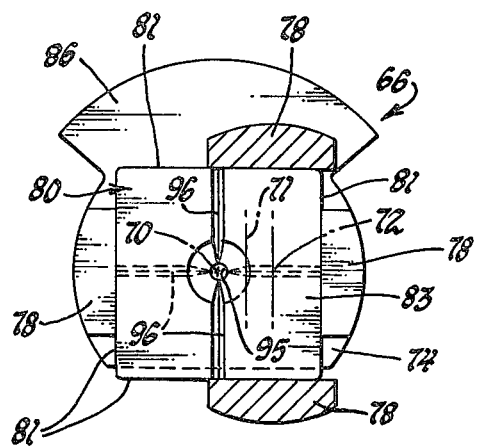
FIG. 4 is a transverse cross-sectional view of the same Oldham coupling balancer looking forward from the plane indicated by the line 4—4 of FIG. 1.
Figure 5:
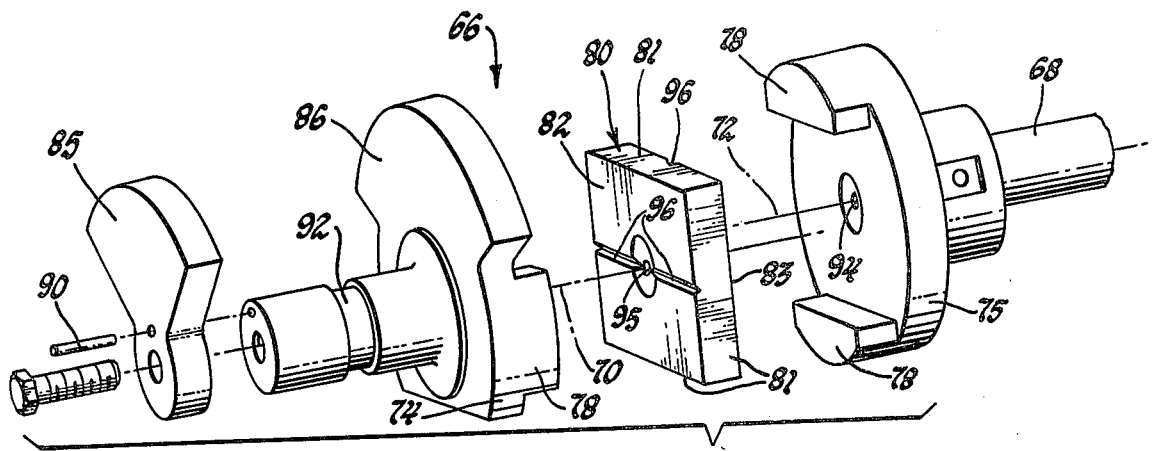
FIG. 5 is a pictorial view further illustrating portions of the Oldham coupling balancer illustrated in FIGS. 3 and 4.
Figure 6:
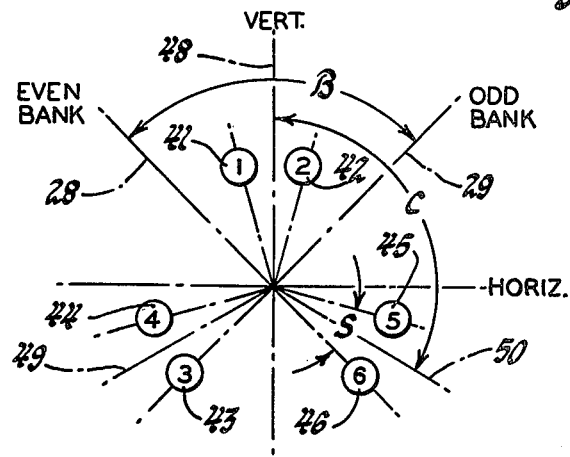
FIG. 6 is a diagrammatic view illustrating the arrangement of the crankpins for the even firing 90° V6 engine.

Within each of the cylinders 30 there is reciprocably disposed a piston 33 that is connected by a connecting rod 34 with the crankshaft 16. For this purpose the crankshaft is provided with three throws 36–38 spaced longitudinally between bearing journals 40 and disposed angularly at equal angles of 120° about the crankshaft axes. Carried by the crankshaft throws are six crankpins 41–46 each throw carrying two longitudinally adjacent crankpins which are angularly offset from one another by 30°. Specifically crankpins 41 and 42 are carried by throw 36 and are displaced respectively 15° clockwise and 15° counterclockwise from the angular displacement axis 48 of the throw. Likewise, crankpins 43 and 44 are arranged in similar fashion relative to displacement axis 49 of throw 37 and crankpins 45 and 46 are likewise arranged relative to displacement axis 50 of crankpin 38. The arrangement of the crankpins and displacement axes is best shown in FIGS. 2 and 6.

Figure 7:
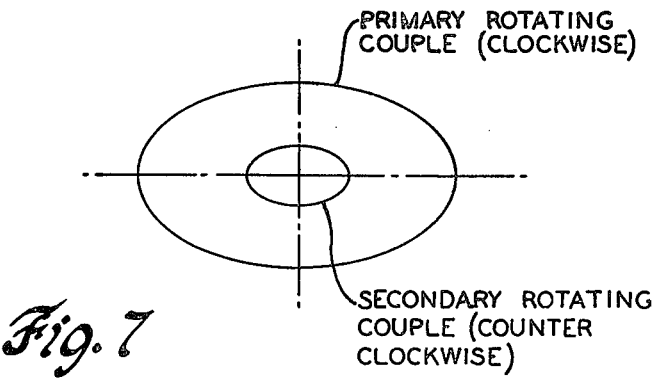
FIG. 7 is a graphical diagram illustrating the elliptical forms of primary and secondary rotating unbalance couples of the even firing 90° V6 engine of the present invention.

It is well known that in an engine of the type described, the reciprocating pistons and the rotating crank throws with their associated connecting rods create centrifugal and reciprocating forces which combine to form primary and secondary rotating unbalance couples acting upon the engine crankcase and cylinder block. FIG. 7 graphically illustrates the form of the unbalance couples created in the described engine as comprising an elliptical primary rotating couple having a horizontal major axis and a vertical minor axis and rotating in the direction of crankshaft rotation, which is clockwise in the illustrated example. The secondary unbalance couple is likewise of elliptical configuration having its major axis horizontal, but its rotational direction is counterclockwise, opposite the direction of crankshaft rotation, and at a rotational velocity twice that of the crankshaft velocity.

It is known that unbalance forces in general, and the rotating couples specifically making up the resultant primary and secondary unbalance couples of the described engine, can be offset, or balanced, by providing the engine with suitable rotating balance weights carried by the crankshaft and/or supplemental balancing shafts or devices. To fully balance both the elliptical primary and secondary couples of the described engine would require, at a minimum, crankshaft balance weights plus additional weights carried on a primary balance shaft rotating opposite to the crankshaft and secondary balance weights carried on two additional secondary balance shafts rotating in opposite directions at twice crankshaft speed. Because of the complexity and added cost of such balancing means, common practice has been to offset only that portion of the primary rotating unbalance couple that can be balanced by the application of balance weights to the crankshaft. The remaining unbalanced primary and the total secondary unbalance couples are then absorbed, to the extent possible, by providing vibration absorbing engine mountings so as to minimize the carry-over of engine vibrations to the vehicle, or other, frame in which the engine is mounted.

The present invention provides an improved balancing arrangement which, with the addition of a relatively small amount of added cost and complexity, is able to provide complete offsetting, or balancing, of the described engine's primary rotating unbalance couple together with offsetting of a large portion of the secondary rotating unbalance couple. This leaves unbalanced only a small remaining secondary unbalance couple which by the proper selection of balancing masses, may be made to act in one or several planes so as to be most easily absorbed in the engine mounting means. To accomplish this, the present invention provides a combination of balance weights, or counterweights, on the crankshaft together with separate balancer means secured to the bottom of the cylinder block and carried below the crankshaft in the engine crankcase and oil sump cavity 15.

As the first portion of a balancer in accordance with the invention, the crankshaft 16 is provided with balance weights 52–55. These are conventionally mounted on opposite sides of the front and rear crankshaft throws 36, 38 respectively and are arranged so that the eccentric front and rear masses are disposed in opposite directions that directly oppose the directions of action of the primary rotating unbalance couple of the engine. In the preferred arrangement, the mass of the balance weights is selected to generate an offsetting couple equal to that of the vertical minor axis of the primary rotating unbalance couple plus one half the value of the difference between the unbalance forces of the minor and major axes.

To offset the remaining primary and a major portion of the secondary unbalance couples, the engine is further provided with a separate Oldham coupler balancer device as previously referred to and generally indicated by numeral 57. Balancer 57 includes a supporting frame 58 attached by bolts 59 to the bottoms of the bearing caps 23, 24, 25 supporting three of the four journals 40 of the crankshaft. At the bottom of the balancer frame, there are rotatably supported in longitudinally spaced journal bearings 61–64 front and rear clevis assemblies 66, 67 respectively and a center clevis 68. The front and rear clevis assemblies are rotatable on a common axes 70 that is displaced as seen in FIG. 2, slightly to the right of a vertical plane 71 that passes through the crankshaft axes and extends with equal spacing between the left and right cylinder banks. The center clevis 68 is rotatable on a longitudinal axes 72 horizontally with axes 70 and displaced equally to the left of the vertical plane 71 as viewed in FIG. 2.

At their adjacent ends, the front and rear clevis assemblies and the center clevis are provided with associated clevis-like end members 74–77, having ears 78 that extend outward from each end member in opposed parallel relation to retain between them a coupler member 80. Each coupler member has the form of a square-ended block with sides 81 which are captured by and laterally slideable within the ears 78 of the associated end members. Ends 82, 83 of each block-shaped coupler member lie in closely opposed relation with corresponding outer ends of the associated end members 74–77. Together, the associated end members 74, 75, 76, 77 cooperate with their associated coupler members 80 to constitute a pair of Oldham couplings that driveably interconnect the front, center and rear clevis assemblies for rotation together at identical velocities.

During rotation the coupler members 80, while rotating at the primary drive speed of the balancer, also orbit in a circular path 84 centered in the vertical plane 71 and passing through the axes 70, 72 of the connected clevis assemblies. This orbiting motion occurs twice in each revolution of the balancer assembly and permits the coupler members 80 to act as secondary balance weights. For this purpose, they are preferably formed of relatively heavy material having good bearing qualities, such as bronze.

The front and rear clevis assemblies are additionally provided with oppositely extending front and rear primary balance weights 85–88. The inner weights 86, 87 are, for convenience, integrally formed with their respective front and rear end members 74, 77. The associated outer weights 85, 88 are removably attached to journal extensions of the end members and aligned by pins 90. The front balance weights are angularly displaced in direction opposite to the rear balance weights to provide the desired primary balancing couple. In like manner, the coupler members 80 of the Oldham couplings are oppositely positioned in their orbital paths so that their eccentric orbiting motions create a secondary balancing couple of desired magnitude.

Lubrication of the bearing surfaces of the various clevis and coupler elements is provided for by suitable oil supply conduits 91 connecting with oil grooves 92 and passages 94 in the various clevis members. These connect with cone ended oil passages 95 in the coupler members and grooves 96 extending across the ends 82, 83 to the adjacent ears 78 of the associated end members.

A driven gear 98 secured to the end member 76 of the center clevis is engaged with a drive gear 99 of like diameter fixed to the engine crankshaft for driving the balancer at a rotational speed equal to crankshaft speed but in the opposite direction.

To provide the desired balancing characteristics, the primary balance weights on the front and rear clevis assemblies are positioned to form a couple that opposes the couple created by the crankshaft balance weights in the vertical plane and which adds to the couple of the crankshaft balance weights in the horizontal plane. The mass of the balancer-carried primary weights 85-88 is selected to equal half the difference between the values of the major and minor axes of the primary unbalanced couple so that the oppositely rotating weights of the balancer combine with the crankshaft carried counterweights to exactly counterbalance the primary unbalance couple of the engine and eliminate completely its having any effect outside the engine.

As to the secondary unbalance couple, the masses and orbiting paths of the Oldham coupling members are selected to oppose the secondary unbalance couple of the engine and reduce this unbalance to the extent possible. The remaining unbalance may be caused to act either in the vertical or horizontal plane or partially in each by selection of the masses of the couplers. In the preferred embodiment, it is considered advantageous to provide equivalent secondary counterbalancing from the Oldham coupler members 80 to exactly offset the minor axes of the eccentric secondary unbalance couple acting in the vertical plane and leave a remaining unbalance, equal to the difference between the major and minor axes, acting in the horizontal plane. This is done, since it is believed easier to absorb in the engine mounting system an unbalance acting in the horizontal plane than in the other possible directions. This could, however, differ in the case of alternative engine mountings or the like.

From the foregoing description, it may be seen that the present invention provides a balancing arrangement for a 90° V6 even firing four stroke cycle internal combustion engine which completely counterbalances the eccentric primary rotating unbalance couple and largely counterbalances the eccentric secondary rotating unbalance couple. This is accomplished with a combination of crankshaft counterweights and a relatively simple balancer arrangement having a single drive connection to drive a single row of longitudinally connected balance elements combining both primary balance weights and secondary balance elements in the form of Oldham couplers rotating and or orbiting in directions opposite to that of crankshaft rotation. The arrangement is such as to permit mounting within the engine oil pan below the engine crankshaft and lubrication by engine lubricating oil supplied from the engine oil system. Tests of such a balancer arrangement applied in an automobile-mounted V6 engine provided a reduction in the vibration noticeable by the vehicle operator to a level not noticeably different than that of a comparable V8 engine.

While the invention has been described by reference to a particular preferred embodiment, it should be understood that various changes could be made without departing from the spirit and scope of the inventive concepts described. Accordingly, it is intended that the invention not be limited to the described embodiment but that it have the full scope permitted by the language of the following claims.

The embodiments of the invention in which an exclusive property or privilege is claimed are defined as follows:

1. A 90° V-6 internal combustion engine having cylinder banks with pistons connected by connecting rods to dual offset pins of three longitudinally spaced throws of a rotatable crankshaft, the pins of each throw being offset 30° and the engine being timed to provide equal firing intervals between cylinders, the piston-crank mechanism causing a mechanical imbalance comprising an eccentric primary rotating unbalance couple turning in the direction of crankshaft rotation and an eccentric secondary rotating unbalance couple turning opposite the direction of crankshaft rotation, both unbalance couples having smaller moment axes lying in a first longitudinal plane spaced equally between the cylinder banks and having larger moment axes lying in a second longitudinal plane normal to said first plane, and the improvement comprising balancing means for the engine including the combination of balance weights on the crankshaft and separate balancer means attached to the engine and rotatably driven at crankshaft speed in opposite rotational direction from the crankshaft, said crankshaft balance weights being sized and positioned to offset a portion of the primary rotating unbalance couple equal in magnitude to the smaller moment of the first plane plus one half the difference between the larger and smaller primary unbalance couple moments, and said separate balancer means comprising a pair of Oldham coupler balancers, each having a pair of end members connected by a coupler member and all rotatable together on spaced parallel axes at identical driven speeds whereby each coupler member orbits in a path through the axes of its connected end members at twice the driven speed, said Oldham coupler balancers being spaced longitudinally of the engine with said rotational axes parallel to the crankshaft and having eccentric balance weights rotatable with at least one of the end members of each balancer, said end member balance weights being selected and positioned to offset the remaining primary unbalance couple in the second plane and the excessive balancing couple in the first plane to provide complete balance of primary couples, and said coupler members having appropriate mass and following orbital paths selected to offset a portion of the engine secondary rotating unbalance couple.

2. An engine in accordance with claim 1 wherein the portion of the engine secondary unbalance couple offset by said coupler members is at least equal in magnitude to the smaller moment of the first plane.

3. An engine in accordance with claim 2 wherein the excess portion of the engine secondary unbalance couple not balanced by said coupler members is left unbalanced.

4. An engine in accordance with claim 3 wherein said portion of the secondary unbalance couple offset by said coupler members is essentially exactly equal in magnitude to the smaller moment of the first plane.

5. A 90° V-6 internal combustion engine having cylinder banks with pistons connected by connecting rods to dual offset pins of three longitudinally spaced throws of a rotatable crankshaft, the pins of each throw being offset 30° and the engine being timed to provide equal firing intervals between cylinders, the piston-crank mechanism causing a mechanical imbalance comprising an eccentric primary rotating unbalance couple turning in the direction of crankshaft rotation and an eccentric secondary rotating unbalance couple turning opposite the direction of crankshaft rotation, both unbalance couples having smaller moment axes lying in a first longitudinal plane spaced equally between the cylinder banks and having larger moment axes lying in a second longitudinal plane normal to said first plane, and the improvement comprising balancing means for the engine including the combination of balance weights on the crankshaft and separate balancer means attached to the engine and rotatably driven at crankshaft speed in opposite rotational direction from the crankshaft, said crankshaft balance weights being sized and positioned to offset a portion of the primary rotating unbalance couple at least equal in magnitude to the smaller moment of the first plane, and said separate balancer means comprising a pair of Oldham coupler balancers, each having a pair of end members connected by a coupler member and all rotatable together on spaced parallel axes at identical driven speeds whereby each coupler member orbits in a path through the axes of its connected end members at twice the driven speed, said Oldham coupler balancers being spaced longitudinally of the engine with said rotational axes parallel to the crankshaft and having eccentric balance weights rotatable with at least one of the end members of each balancer, said end member balance weights being selected and positioned to offset a portion of the engine primary rotating unbalance couple, and said coupler members having appropriate mass and following orbital paths selected to offset a portion of the engine secondary rotating unbalance couple.

6. A machine having a rotatable shaft and mechanism causing a mechanical imbalance comprising an eccentric primary rotating unbalance couple turning in the direction of shaft rotation and an eccentric secondary rotating unbalance couple turning opposite the direction of shaft rotation, both unbalance couples having smaller moment axes lying in a first longitudinal plane and having larger moment axes lying in a second longitudinal plane normal to said first plane, and the improvement comprising balancing means for the machine including the combination of shaft balance weights rotatable with the shaft and separate balancer means attached to the engine and rotatably driven at shaft speed in opposite rotational direction from the shaft, said shaft balance weights being sized and positioned to offset a portion of the primary rotating unbalance couple, and said separate balancer means comprising a pair of Oldham coupler balancers, each having a pair of end members connected by a coupler member and all rotatable together on spaced parallel axes at identical driven speeds whereby each coupler member orbits in a path through the axes of its connected end members at twice the driven speed, said Oldham coupler balancers being spaced longitudinally of the machine with said rotational axes parallel to the shaft and having eccentric balance weights associated and rotatable with at least one of the end members of each balancer, said end member associated balance weights being selected and positioned to offset a portion of the machine primary rotating unbalance couple, and said coupler members having appropriate mass and following orbital paths selected to offset a portion of the machine secondary rotating unbalance couple.

* * * * *